May 12, 1964 — F. J. LUKETA — 3,132,395
ADJUSTABLE THREE POINT "G" HOOK
Filed April 9, 1962 — 2 Sheets-Sheet 1
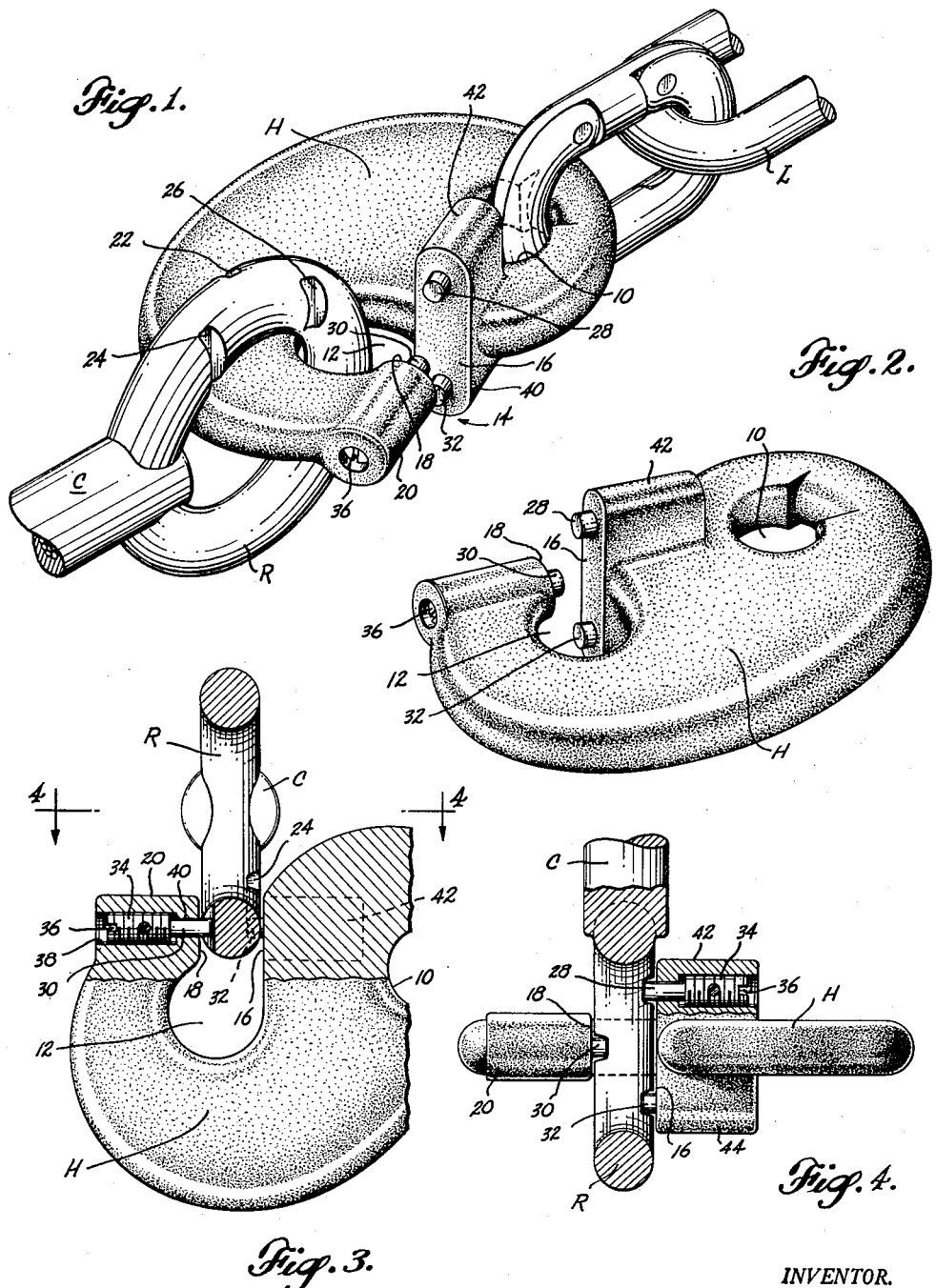
INVENTOR.
FRANK J. LUKETA
BY
Mathis and Graybeal
ATTORNEYS May 12, 1964

F. J. LUKETA 3,132,395

ADJUSTABLE THREE POINT "G" HOOK

Filed April 9, 1962

INVENTOR.
FRANK J. LUKETA

BY
Mathis and Graybeal
ATTORNEYS

United States Patent Office 3,132,395
Patented May 12, 1964

3,132,395
ADJUSTABLE THREE POINT "G" HOOK
Frank J. Luketa, 5567 Greenwood Ave.,
Seattle 3, Wash.
Filed Apr. 9, 1962, Ser. No. 185,979
18 Claims. (Cl. 24—201)

The present invention relates to hook and ring coupler means of the engageable-disengageable type, and more particularly to such coupler means wherein a plurality of notches in any eye ring mesh with a corresponding number of pegs or stubs extending outwardly from the base and point portions of a hook when inserted into or out of the throat of the hook for connection and disconnection of the hook from the eye ring.

More particularly, certain aspects of the present invention relate to an improved form of so-called G hook and eye ring, wherein a plurality of notches are provided in the eye ring and corresponding pegs or stubs project into the hook throat and are arranged to be snugly and correlatively interfittable with the ring notches, so that exact alignment is necessary before the eye ring can be inserted into or removed from the hook throat, making it quite difficult for accidental or unintentional disconnection to occur. Another aspect of the invention involves making such pegs readily adjustable so that wear on either the pegs or the rings can be compensated for by adjusting the pegs so that they extend further into the hook throat.

Yet another aspect of the invention relates to using replaceable stubs in place of adjustable pegs. Adjustment for wear is provided by either shimming the worn stub assembly or by replacing the worn stub assembly with a new stub assembly having longer stubs.

One field of use of the hook and eye couplers of the present invention is in connection with a trawl net gear, such as disclosed in my copending application Serial No. 132,234, filed August 17, 1961, now abandoned, and entitled Drum Trawling Gear and Method. Particular reference should be made to hooks 34 and eyes 93, as well as hooks 13 and eyes 37 of the trawl net gear disclosed in said application, as such hook and eye ring combinations could advantageously be constructed in accordance with the present invention.

The hook and ring coupler means of the instant invention also has utility in many and widely varied applications wherein quick engagement or disengagement of a hook with a ring by precise manipulation of the hook is desired, and accidental or unintentional disengagement of the hook from the ring is undesired.

Conventional G hooks and rings, as used in the fishing industry for example, have an eye ring with one or more reduced diameter access segments, or escape "flats," to accommodate the spacing or throat between the hook point and hook base or shoulder. In conventional design, the ring access segment and the configuration of the hook shoulder and hook point are of generally tapering contour. On an occasion where a hook throat happens to fall near the reduced dimension or flat area of the ring, the engaging surfaces being of tapering contour often tend to guide the hook throat into alignment with the ring flat and cause inadvertent disengagement.

In order to obviate such inadvertent disengagement, the hook and ring coupler of the present invention utilizes a plurality of spaced notch sections in the eye ring and a corresponding number of matching projections extending from the hook shoulder and point portions into the hook throat portion. The arrangement of the notch sections and the projections is such that the notch sections must be in exact alignment with the projections before engagement and disengagement of the ring from the hook can be affected. In addition, the notch sections and the projections are sized so as to provide a snug interfit between the two, thereby requiring an even more exact orientation of the hook projections with the ring notch sections before engagement and disengagement can occur.

Thus, the provision of a plurality of matched, snugly interfitting, spaced, hook projections and ring notch sections prevents inadvertent disengagement of the hook from the eye because with such arrangement the possibility of accidental alignment of the hook projections with the eye ring notch sections is extremely small.

In a preferred form of this invention the projections are in the form of adjustable pegs, thereby providing a means for compensating for wear. When wear shortens the exposed ends of the pegs or deepens the notch sections, the pegs are merely adjusted to project deeper into the notch sections, thereby maintaining the snug interfit between the pegs and the notch sections. The pegs are made adjustable by providing them with threaded base portions which engage corresponding threaded bores located in the point and base or shoulder portions of the hook.

Specific variations of hook and ring couplers configured according to the invention include a modification in the construction of the projections wherein detachable stub assemblies are provided in place of the adjustable pegs. Compensation for wear in this form of the invention is provided for by either shimming the worn assemblies or replacing them with new assemblies. The stub sections are detachably secured to the point and shoulder portions of the hook by any suitable form of fastening means such as by means of bolts having their head portions countersunk into the body of the hook.

These and other objects, features, advantages and characteristics of engageable-disengageable hook and ring couplers according to the present invention will be apparent from the following typical and therefore non-limitive embodiments of such couplers as discussed below, in conjunction with the accompanying illustrations thereof, wherein like letters and numerals refer to like parts, and wherein:

FIG. 1 is a perspective view of a hook eye ring coupler employing adjustable peg projections and corresponding ring notch sections according to the invention;

FIG. 2 is a perspective view of the hook per se, as viewed from an aspect opposite to the view of FIG. 1;

FIG. 3 is a view taken radially of the coupler eye in a plane transversely through a notch section of the eye ring to illustrate the relation of the hook and eye during connection or disconnection movement therebetween, and showing the details of an adjustable peg projection;

FIG. 4 is a view taken substantially along line 4—4 of FIG. 3, showing the spacing of the sets of corresponding peg projections and notch sections, and further showing the snug interfit between the projections and the notch sections;

Figure 5:
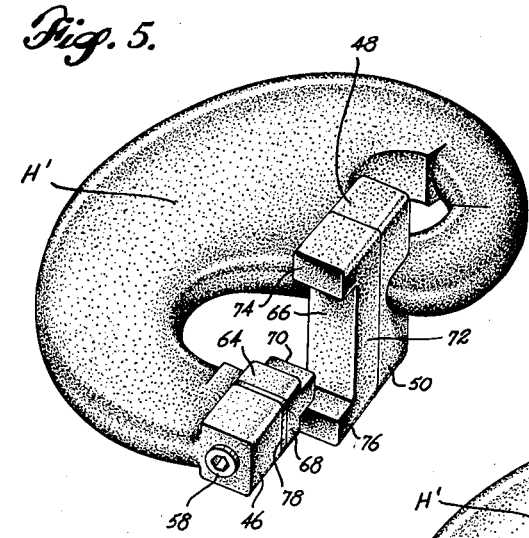
FIG. 5 is a perspective view of a modified G hook according to the present invention, wherein the projections are in the form of detachable stub sections.
Figure 6:
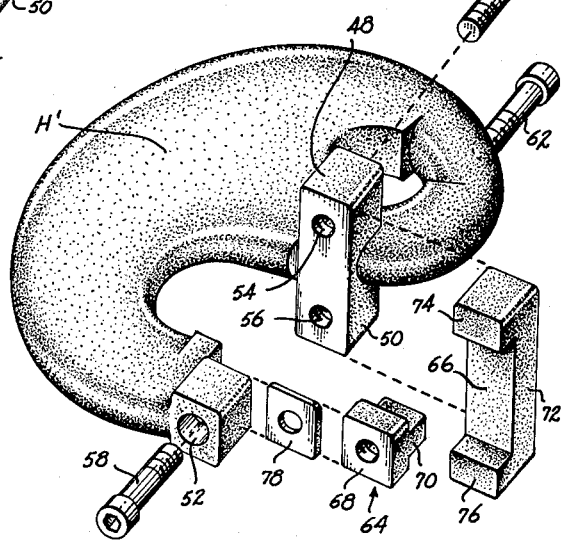
FIG. 6 is an exploded view of the modified G hook shown in FIG. 5, showing the manner in which the stub sections are detachably secured to the point and base portions of the hook, and also showing the fastening means used.
Figure 7:
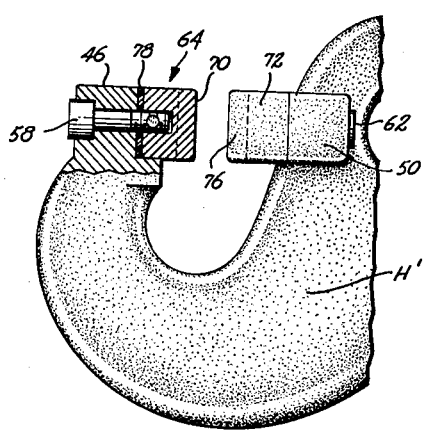
Figure 8:
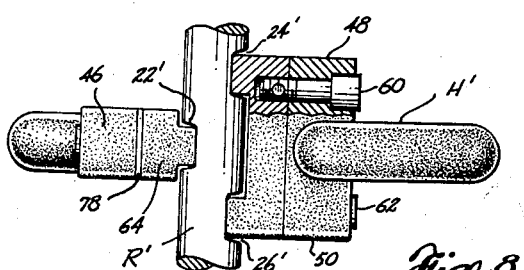

FIG. 7 is a view of a fragmentary portion of the G hook shown in FIG. 5 taken perpendicular to the plane of the hook and showing the relation of the fastening stub to the hook point, the hook point stub assembly, and a shim; and FIG. 8 is a view taken substantially along the plane of the G hook shown in FIG. 5, showing the relation of the stubs and stub assembly of the hook to the notch sections of an eye ring.

Turning to a specific consideration of the hook and eye ring coupler shown in FIGS. 1–4, the view of FIG. 1 is of a typical use of such hook H and eye ring R for joining a lazy line chain link L and the swaged end of a sweep line C, for example. In use, of course, one segment to be coupled, such as chain link L, is placed in the hook eye 10, and the other segment to be coupled, such as line C, is joined to the ring R. With hook H and ring R connected, the inner hook area 12 loosely accommodates the ring R. Access of the ring R into area 12 of hook H is through the point-to-shoulder hook throat, designated 14, which throat is defined by a shoulder surface 16 and a surface 18 of hook point 20.

As shown in FIGS. 1 and 4, for example, ring R is provided with a plurality of notch portions 22, 24, 26 of suitable depth and width to snugly accommodate a like number of projections 28, 30, 32 extending substantially at right angles from hook shoulder surface 16 and hook point surface 18 into hook throat 14. Said ring notch portions 22, 24, 26 cooperate with hook projection portions 28, 30, 32 in the manner portrayed at FIG. 4 to provide that disengaging movement of the hook H with respect to the ring R can occur only when the hook projection portions 28, 30, 32 are in precise alignment with their corresponding ring notch sections. Otherwise, if there is misalignment such as shown in FIG. 1, projections 28, 30, 32 will prevent the disengagement of the ring R from the hook H, as the passageway defined between the outer reaches of projections 28, 30, 32 is substantially narrower than the ring diameter and consequently will not accommodate the ring R. The projections 28, 30, 32 consist of adjustable peg-like members provided with threaded base portions 34 and cylindrical head portions. Of course, it is to be understood that while the head portion of each pojection 28 is shown as being circular in cross-section such shape is merely illustrative of one of many possible shapes and is therefore non-limitive. For example, the head portion could just as well have either a square or rectangular shaped cross-section.

As can most clearly be seen in FIG. 3, the hook point 20 is provided with a first, threaded bore 38 for accommodating the threaded base 34 of peg projection 30 and a second, smaller, smooth-walled bore 40 for accommodating the head portion of said peg projection 30. On the opposite side of the hook throat 14 forming an integral part of the hook shoulder or base there is provided two oppositely directed bosses 42, 44 containing identical bores for accommodating peg projections 28, 32.

The projections 28, 30, 32 are initially screwed into their respective bores and adjusted to the notch sections of ring R by inserting the end of a screwdriver into slots 36 formed in the base end of said projections 28, 30, 32.

During long periods of continuous use, the projecting ends of peg projection 28, 30, 32 are shortened by wear, and the notch sections 22, 24, 26 of the eye ring R wear deeper, creating a loose or sloppy fit between said projections and said notch sections. When such wear occurs the user need only insert the end of a screwdriver into slot 36 and adjust the pegs so that they extend a slight bit further into the hook throat area 12 and again fit snugly within their respective notch sections. And, in the event that one or more of the peg projections 28, 30, 32 are either damaged or broken such damaged peg projection can easily be removed and replaced. Of course, all of the peg projections 28, 30, 32 can be replaced when they have worn to the point where further adjustment is impossible. It is easily evident that the provision of adjustable and replaceable peg projections 28, 30, 32 give longer life to the hook H as the same hook H can be used throughout the life of several sets of peg projections.

Turning now to a specific consideration of the hook and eye ring coupler shown in FIGS. 5 to 8, inclusive, wherein the adjustable peg projections are replaced by removable stub assemblies, the view of FIG. 5 is of the modified form of hook alone, the ring portion of the hook and eye ring coupler being the same as that used in connection with the preferred hook form described above in connection with FIGS. 1 through 4. In FIG. 5, hook H', hook point 46 and hook shoulder bosses 48, 50 are of a general square configuration, with squared edges as shown, and are provided with bores 52, 54, 56 for receiving and accommodating fastening studs 58, 60, 62 which in turn secure stub assemblies 64, 66 to the hook point 46 and hook bosses 48, 50, respectively. Stud assembly 64 has a generally square base 68 corresponding in dimension to the hook point 46 and when assembled becomes in effect an extension of hook point 46. Extending out from base 68 is a stub prjection 70 which is sized to snugly slide within a notch section 22' formed in an eye ring R' as illustrated in FIG. 8. Stub assembly 66 has a base portion 72 of the same general cross sectional configuration as the hook shoulder consisting of bosses 48, 50 and when assembled forms a continuation of said shoulder as illustrated in FIG. 5. Extending from the base portion 72 are two spaced apart stub projections 74, 76 which are sized to snugly slide within notch sections 24', 26' of eye ring R' as illustrated in FIG. 8.

The cooperation between stub projections 70, 74, 76 and ring notch portions 22', 24', 26' is identical to that between peg projections 28, 30, 32 and ring notch portions 22, 24, 26 of the hook and eye ring coupler of FIGS. 1–4. That is, disengagement of the hook H' with respect to the ring R' can occur only when the hook stub projections 70, 74, 76 are in precise alignment with their corresponding ring notch sections 22', 24', 26'.

Compensation for wear in this form of the invention is provided for by either shimming the worn stub assemblies or by replacing them with new assemblies. A shim 78 of nylon or some other suitable material is shown sandwiched between hook point 46 and stub assembly 64. However, the shim could just as well be located between stub assembly 66 and the hook shoulder, or if it became necessary, shims could be placed at both locations. Of course, it is evident that the stub projections 70, 74, 76 continue to wear, the old shims must be replaced by new thicker shims or additional shims must be added.

As a further modification, the two projections might be located on the hook point with the one projection being located on the hook base or shoulder. A still further modification would involve locating the projections on the ring surface and the notched sections on the hook.

From the foregoing, further variations, adaptations, modifications and characteristic features can be evolved by those skilled in the arts to which the invention is addressed, within the scope of the following claims.

What is claimed is:

1. A hook and ring coupler comprising a coupling ring with a plurality of notch access segments and a coupling hook having a point opposed by a shoulder providing an access throat therebetween, said hook being provided with a single projection extending from said point and two projections extending from said shoulder into said throat, said coupling ring access notch sections being constructed and arranged to snugly accommodate said hook projections when put in exact alignment with said hook projections to provide for coupling and decoupling of said hook from said ring.

2. A hook and ring coupler in accordance with claim 1, wherein means are provided for adjusting the extent of penetration of said projections into said hook throat.

3. A hook and ring coupler comprising a coupling ring with a plurality of notch access segments and the coupling hook having a point opposed by a shoulder providing an access throat therebetween, said ring having two sides, with two of said notch access segments being located on one of said ring sides and spaced apart, and with a third of said notch access segments being located on said other side between said first two notch access segments, said hook being provided with a single projection extending from said point and two projections extending from said shoulder into said throat, said coupling ring access notch sections and said hook throat projections each being spaced so as to mesh when put in exact alignment with each other during coupling and decoupling movement of said hook from said ring.

4. A hook coupler of the type used for connecting to a coupling ring with a plurality of access notch sections, said coupling hook having a throat portion formed between spaced apart shoulder and point portions and a plurality of throat projections, said projections being in the form of removable stub assemblies detachably secured to said hook shoulder and point portions by fastening means.

5. A hook coupler in accordance to claim 4, wherein one of said stub projection assemblies is provided with but a single stub projection and the other of said assemblies is provided with at least two stub projections.

6. A hook and ring coupling assembly comprising a coupling ring with a plurality of access notch sections and a coupling hook having a throat portion defined by a hook point and a hook shoulder, and a plurality of removable throat projections extending out from said hook point and said hook shoulder into said hook throat portion, said projections being equal in number to the notch sections of the coupling ring.

7. A hook coupler in accordance with claim 6, wherein there is but a single projection extending from said hook point and two spaced apart projections extending from said hook shoulder.

8. A hook and ring coupler of the engageable-disengageable type comprising a coupling hook and a coupling ring, said coupling hook having a throat portion formed between spaced apart point and shoulder portions and a plurality of throat projections, and said coupling ring having first and second sides, at least one notch formed in the first side and a plurality of notches formed in the second side, with each of said notches in the second side being circumferentially spaced around the ring from the notch on the first side, and with said projections on the hook being equal in number to and correlatively interfitable with the notches of the coupling ring.

9. A hook and ring coupler of the engageable-disengageable type comprising a coupling hook and a coupling ring, said coupling ring having a plurality of access notched sections, and said coupling hook having a throat defined by a hook point and a hook shoulder, with a single projection extending from said hook point into the hook throat, and two projections extending from said hook shoulder into the hook throat, with one of said hook shoulder projections being located to one side of said hook point projection and the other hook shoulder projection being located on the other side of said hook point projection, and with the spacing between said hook projections being the same as the spacing between the coupling ring notch sections, with the hook throat projections being correlatively interfittable with the ring notch section.

10. A hook and ring coupler comprising a coupling hook having a throat portion and a plurality of throat projections, and a coupling ring having two sides and a plurality of access notch sections staggered between said two sides and being of the same spacing as the hook throat projections, with the said hook throat projections being correlatively interfittable with the ring notch sections.

11. A hook and ring coupler comprising a coupling ring having at least three notch access segments and a coupling hook having a point opposed by a shoulder providing an access throat therebetween, said hook also having a plurality of projections extending from said point and said shoulder into the throat, with the hook projections being equal in number to the notch access segments of the coupling ring, and with said coupling ring access notch segments and said hook throat projections each being constructed to snugly interfit together when put in exact alignment wtih each other to provide for coupling and decoupling of said hook from said ring.

12. A hook and ring coupler comprising a coupling ring with a plurality of notch access segments and a coupling hook having a point opposed by a shoulder providing an access throat therebetween, said hook being provided with projections extending from said point and said shoulder into said throat, and means for adjusting the extent of penetration of said projections into said hook throat, said coupling ring access notch sections and said hook throat projections each being constructed to snugly interfit together when put in exact alignment with each other to provide for coupling and decoupling of said hook from said ring.

13. A hook and ring coupler in accordance with claim 12, wherein said adjusting means includes threaded base portions on each of said projections.

14. A hook and ring coupler in accordance with claim 12, wherein said adjusting means includes a shim associated with at least one of said projections.

15. A hook and ring coupler comprising a coupling ring with a plurality of notch access segments and a coupling hook having a point opposed by a shoulder providing an access throat therebetween, said hook being provided with projections extending from said point and said shoulder into said throat and means for removing each of said projections from said hook, said coupling ring access notch segments and said hook throat projections each being constructed to snugly interfit together when put in exact alignment with each other to provide for coupling and decoupling of said hook from said ring.

16. A hook and ring coupler comprising a coupling ring with a plurality of notch access segments and a coupling hook having a point opposed by a shoulder providing an access throat therebetween, said hook being provided with projections extending from said point and said shoulder into said throat and means for removing each of said projections from said hook, said coupling ring access notch segments and said hook throat projections each being constructed to snugly interfit together when put in exact alignment with each other to provide for coupling and decoupling of said hook from said ring.

17. A hook and ring coupler in accordance with claim 16, wherein said means for removing each of said projections from said hook includes threaded base portions on each of said projections.

18. A hook and ring coupler in accordance with claim 17, wherein said means for removing each of said projections from said hook include fastening stubs for securing said projections to said hook.

References Cited in the file of this patent

UNITED STATES PATENTS

| | | |
|---|---|---|
| 537,840 | Maine | Apr. 23, 1895 |
| 615,827 | Fehring | Dec. 13, 1898 |
| 735,445 | Banks | Aug. 4, 1903 |
| 1,101,815 | Sandifur | June 30, 1914 |
| 1,478,507 | Brooks | Dec. 25, 1923 |
| 1,494,289 | Round | May 13, 1924 |
| 1,649,655 | Benson | Nov. 15, 1927 |
| 2,740,253 | Waller | Apr. 3, 1956 |

FOREIGN PATENTS

| | | |
|---|---|---|
| 568,911 | France | Apr. 3, 1924 |
| 910,342 | France | June 4, 1946 |
| 915,352 | France | Nov. 5, 1946 |